2 Sheets—Sheet 1.

J. CASE,

Assignor of one-half interest to THE FARMER'S FRIEND MANUFACTURING CO.

Corn-Planter.

No. 8,547 Reissued Jan. 21, 1879.

Witnesses:
Donn P. Twitchell.
William W. Dodge.

Inventor:
Jarvis Case
and the
Farmers Friend Manufacturing Co.
By their attys
Dodger & Co

N. PETERS, PHOTO-LITHOGRAPHER, WASHINGTON, D. C.

J. CASE,

Assignor of one-half interest to THE FARMER'S FRIEND MANUFACTURING CO.

Corn-Planter.

No. 8,547. Reissued Jan. 21, 1879.

Witnesses:

Donn P. Twitchell

William W. Dodge

Inventor:

Jarvis Case and the Farmers Friend Manufacturing Co

By their attys.

Dodge & Sons

N. PETERS, PHOTO-LITHOGRAPHER, WASHINGTON, D. C.

UNITED STATES PATENT OFFICE.

JARVIS CASE, OF DAYTON, OHIO, ASSIGNOR OF ONE-HALF INTEREST TO THE FARMERS FRIEND MANUFACTURING CO., OF SAME PLACE.

IMPROVEMENT IN CORN-PLANTERS.

Specification forming part of Letters Patent No. 145,396, dated December 9, 1873; Reissue No. 8,547, dated January 21, 1879; application filed November 29, 1878.

*To all whom it may concern:*

Be it known that I, JARVIS CASE, of Dayton, in the county of Montgomery and State of Ohio, have invented certain new and useful Improvements in Corn-Planting Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to that class of corn-planters which use a front frame mounted on runners and a rear frame mounted on wheels, commonly known as "two-row" planters; and the invention consists in connecting bars forming an extension of the wheel-frame to the top of the runner-frame by a joint or coupling which permits the runners to rock both lengthwise and crosswise of the machine independently of the wheel-frame, whereby the runners are permitted to adjust themselves readily to the inequalities in the surface of the ground under all circumstances; in applying to the wheel-frame a driver's seat, sustained upon a pivoted swinging standard of peculiar construction; in extending the rotary feed-plates through the side of the hopper, to expose the seed in the cells in such relation to the seats of the driver and dropper that they may either or both view the same; and arranging the pawls to act alternately and in opposite directions, in such manner that the stroke required on the part of the hand-lever and pawls is greatly reduced; and, in minor details, hereinafter explained.

Figure 1:
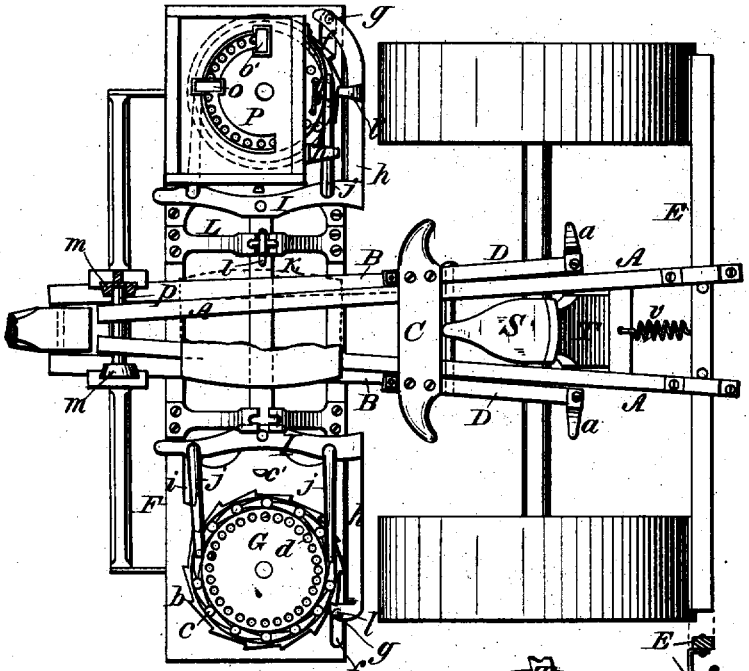
Figure 2:
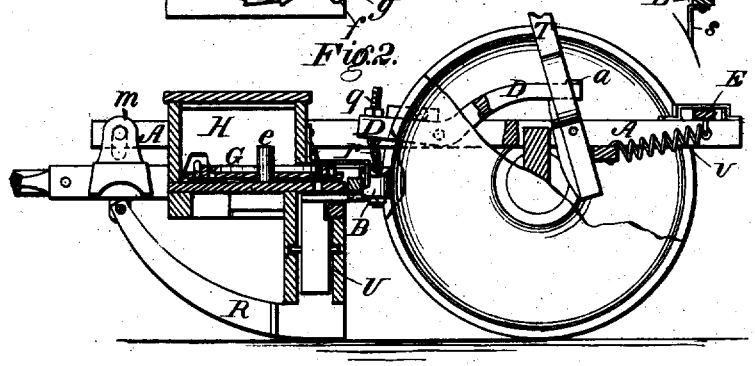
Figure 3:
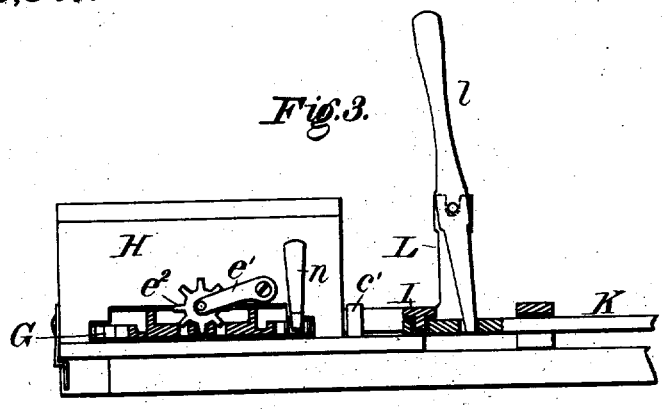

Figure 1 is a top-plan view; Fig. 2, a longitudinal section taken through one of the hoppers; Fig. 3, a rear elevation of one of the hoppers, with its mechanism; and Figs. 4, 5, and 6, views of portions shown in detail.

Figure 4:
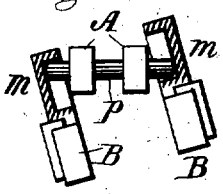

In constructing my planter I make a rear frame, consisting of an axle mounted on two wheels, with two bars, A, rigidly attached and extending to the front end of the runner-frame, to which they are attached, as represented in Figs. 1, 2, and 4.

As shown, there are two bars, B, rigidly attached to the front frame, and at their front ends are bolted two uprights or plates, *m*, each having on its inner face a vertical recess, as represented in dotted lines in Fig. 2 and in section in Fig. 4, in which recesses the ends of a bolt, *p*, rest, this bolt passing transversely through the front ends of the bars A, by which means there is secured a flexible joint that permits the two frames to adjust themselves independently to the irregularities of the surface, the runner-frame being thus left free to rock or tip both lengthwise and crosswise of the machine.

The bars B also extend back in rear of the front frame, and at their rear ends are connected, by short chains *r*, Fig. 2, and an eye-bolt, *q*, to the front end of bars D, which are pivoted to the sides of the bars A, (see Figs. 1 and 2,) and are provided at their rear ends with projections *a* for the driver's feet. Near their front ends these bars D are rigidly connected by a cross-bar, C, the ends of which project beyond the bars, as shown in Fig. 1, forming rests for the driver's feet when the seat is thrown forward to force the runners into hard soils.

By means of the chains and eyebolts the front frame can be adjusted in relation to the rear frame so as to run more or less deep, and by the levers D the front frame can be raised clear of the ground in turning around.

Figure 5:
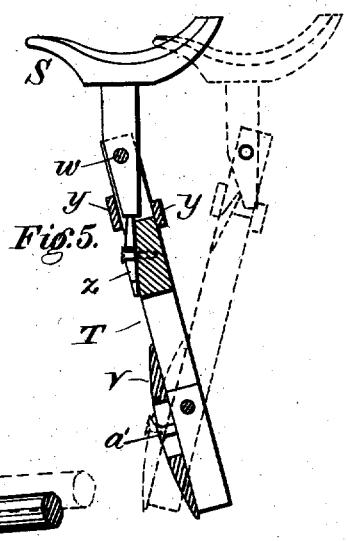

The seat S is supported on a jointed bar or support, T, (shown in detail in Fig. 1,) which bar is pivoted between the bars A, a short distance in rear of the axle, so that it can be swung forward and made to rest against the axle, as shown by the full lines in Fig. 5, or be swung back, as represented by the dotted lines. By thus throwing the seat forward and backward, the driver is enabled to apply his weight at will to force the runners into the ground without dismounting or changing his position on the seat.

In order to regulate the position of the seat I attach to the front side of the standard T a sliding piece, V, made wedge-shaped at each end, it being held by a screw or bolt, $a'$, so that the piece V can be adjusted up or down on the standard T, and thus regulate the inclination at which it shall stand both when forward and when back. As shown in Fig. 5, there is a joint near the upper end of the standard T, thus permitting the seat S to tip, so as to remain in a horizontal position whichever way the standard is inclined. A sliding wedge, $z$, is secured by a bolt to the front of the standard T, below its joint, so that by slipping it up between the cross-piece $y$ and the part attached to the seat the latter can be rigidly locked in place.

In order to keep the wheels from becoming clogged with dirt, I arrange a bar, E, transversely in rear of the wheels, as shown in Figs. 1 and 2, having scrapers $s$ attached; and to hold these in contact with the wheels, I attach to the bar a spring, $v$, which is arranged to be disconnected, when desired.

The planting or dropping mechanism proper is mounted on the front frame, and arranged to pass the seed from the hopper H through tubes U in the heels of the runners R, in the usual manner. This mechanism consists of a disk-plate, G, located at the bottom of the hopper, and held in place by a stud or pin, $e$, around which it is made to revolve in a horizontal plane.

Figure 6:
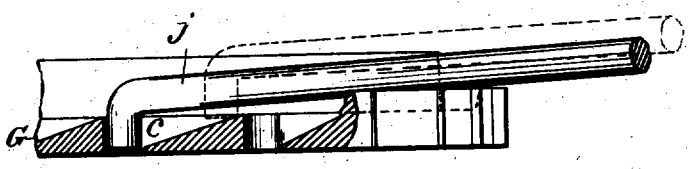

In Fig. 1 one of these disks is shown with the hopper and other parts removed, and, as there shown, it is provided on its periphery with a series of ratchet-teeth, and on its face with a circular groove, in which is formed another series of ratchet-teeth, each terminating with a hole, $c$, these being best seen in Fig. 6. Inside of these is a row of holes, $d$, which constitute the seed cups or cells, and through which the seed passes, as usual, into the tubes U.

To operate these disks, I provide a yoke, I, which has a long arm, $h$, on the rear, and a short arm, $i$, at the front, as shown in Fig. 1, the arm $h$ having at its extremity a pin, $g$, that works in a slot, $f$, in the bed-plate, thus causing the yoke to move in a straight line, and also limiting its movements. To this yoke are pivoted loosely two rods, $j$, the opposite ends of which project over the disk G, and, being bent at right angles at their extremities, rest in the circular groove and engage with the ratchet-teeth upon the upper face of the plate, as shown clearly in Fig. 6. As these rods are located on opposite sides, it follows that as the yoke is moved in one direction the rod $j$, at one side, moves the disk G, while the rod at the opposite side rides up the inclined face of a tooth at that side, and as the motion of the yoke is reversed the latter rod shoves the disk on in the same direction, the first rod $j$ then riding up over a tooth on its side.

It will be observed that there are twice as many seed-cells in the plate G as there are ratchet-teeth in either row, and thus when the yoke I is moved in either direction it is required to be moved but half the distance from one ratchet-tooth, $c$, to the next, because while the rod $j$ is advancing toward the tooth the latter is at the same time advancing to meet it, and thus the yoke is required to move only half the distance between the ratchet-teeth in order to bring the seed-cells successively into the required position to drop seed into the tube U below. This decreased movement of the yoke, of course, lessens to a corresponding extent the distance that the hand-lever $l$ has to be moved, and thus the labor of the dropper is greatly lessened, for, although he has the same number of motions to make in order to plant a given number of hills, he has but half the distance through which to continue the motion that is required in ordinary machines working on this plan.

In order to prevent the disks from moving too far, the end of arm $i$ is arranged to come just in front of one of the teeth $b$ and act as a stop when the yoke is moved in one direction, while a lug, $l'$, on the arm $h$ serves in like manner as a stop when the yoke moves in the opposite direction. There is a yoke, I, for each hopper, and they are connected by a bar, K, which has a hole on each side of the dropper's seat for a lever, $l$, so the yokes and their attachments can be operated by either hand, this lever $l$ being pivoted loosely in standards L upon the front frame, as shown in Figs. 1 and 3.

In order to enable the dropper to see whether the cells are properly filled with seed, I arrange the disks G so they will protrude through an opening in the rear side of the hopper, as shown in Figs. 1 and 3.

It will be noted that the arrangement of the protruding edges of the disks is such in relation to the seats and the dropping-lever that both the driver and dropper can at all times see said edge while in their places and performing their duties.

To the rear side of the hopper I pivot loosely a short metal bar, $e^1$, which has a sprocket-wheel, $e^2$, pivoted to the loose end of the bar $e^1$, with its teeth of such size and distance apart that one shall enter each cell as the disk revolves. In each hopper, over the disk G, I place a plate, P, Fig. 1, which has a semi-circular opening in it for the grain to pass down and enter the cells in the disk below, and to this plate, which is set loosely in the hopper, I secure two cut-offs, $o$ and $o'$, so that if the first fails to act perfectly the second will complete the operation, and thus insure the depositing of no more than the required quantity of seed.

By these several improvements I produce a planter that is very perfect in its operation and not liable to get out of order.

I am aware that disks have before been used to measure and drop seed; but in all cases they have been operated by spring ratchets or arms; or, if by rigid arms, these latter have had a lateral as well as a to-and-fro movement, rendering the mechanism more complicated and liable to derangement. By my plan, it will be seen that the yoke and its operating devices have simply a to-and-fro movement, and that no springs are used, my rods *j*, which move the disks, being held down and made to engage with the teeth upon the face of the disks G by gravity alone.

Having thus described my invention, what I claim is—

1. The rotating plate G, provided with the seed-cells *d* and the ratchet-teeth *c* on its face, in combination with the rod *j*, said parts being constructed and arranged to operate as and for the purpose set forth.

2. The disk G, provided with the teeth *b* on its edge, in combination with the arms *h* and *i*, arranged to operate as stops to limit the motion of the disks, as set forth.

3. The plates *m*, provided with vertical recesses or slots, in combination with the pin *p*, applied as described, to form a flexible joint between the front and rear frames of a planter.

4. The lever D, pivoted to the bars A of the rear frame, and connected, by means of the chains *r* and adjusting-bolts *q*, to the rear end of the front frame, for the purpose of elevating and adjusting the latter, all combined and operating as set forth.

5. The pivoted standard T, having the seat S, made adjustable thereon, and provided with the adjustable wedges V and *z* and bars *y*, all constructed and arranged to operate substantially as described, whereby the seat can be moved forward and back and kept in a horizontal position, as set forth.

6. In a corn-planter, the bar provided with the scrapers, in combination with the central detachable spring, all constructed and arranged to operate as set forth.

7. In a two-row planter, the combination of two wheels and an axle, two bars attached to the axle and extending forward, and a front runner-frame connected on its top to the bars by a joint constructed to permit the runner-frame to rock or tip sidewise independently of the wheel-frame, substantially as described.

8. The combination of a front-runner frame, a wheeled frame having a forward extension, connected to the top of the runners by a joint constructed to permit the runner-frame to tip sidewise, and treadles or foot-levers mounted on the wheel-frame and connected to the runner-frame by yielding or flexible connections.

9. The combination of the two runners connected by transverse bars, the wheeled axle, the two bars A, mounted on the axle and extending forward, and a transverse rod or bolt secured to the front ends of the bars A, and bearing in vertically grooved or slotted standards on top of the runner-frame, as shown.

10. In a two-row corn-planter, the combination of a front-runner frame, a rear-wheeled frame overreaching the same, and a connecting-joint, constructed substantially as shown, so as to permit the runner-frame to rise and fall at the rear end and the runner and wheel frames to tip or rock sidewise independently of each other, whereby the runners are permitted to rise and fall independently of each other and of the wheel-frame.

11. In a two-row planter operated by hand, rotary feed-plates having their edges exposed outside of the seed-boxes, and a driver's seat located in relation to the hoppers, as shown and described, so that the driver may at all times view the exposed edges of the plates, so as to determine when the machine is dropping properly.

12. In a corn-planter, a rotary horizontal feed plate or disk, provided with ratchet-teeth, in combination with a hand-lever, a reciprocating feed-bar, and two pawls connected with the bar, substantially as shown, so that as each pawl advances to engage a new tooth the tooth is advanced to meet the pawl, whereby the movement of the lever is reduced in length, as described.

13. In a two-row corn-planter, the combination of a main frame and hoppers thereon, rotary feed-plates provided with seed-cells and arranged to carry the seed outside of the hopper before dropping it, and a dropper's seat and hand-lever for operating the plates located in relation to the hopper and plates, so that the dropper may view the exposed plates.

14. In a two-row planter, the combination of horizontal rotary feed-plates arranged to carry the seed outside of the hopper to drop it, a hand-lever for operating said plates, and seats for the driver and dropper so located that both may view the exposed portion of the plates while performing their duties.

JARVIS CASE.

Witnesses:
P. T. DODGE,
DONN I. TWICHELL.